Figure 1:
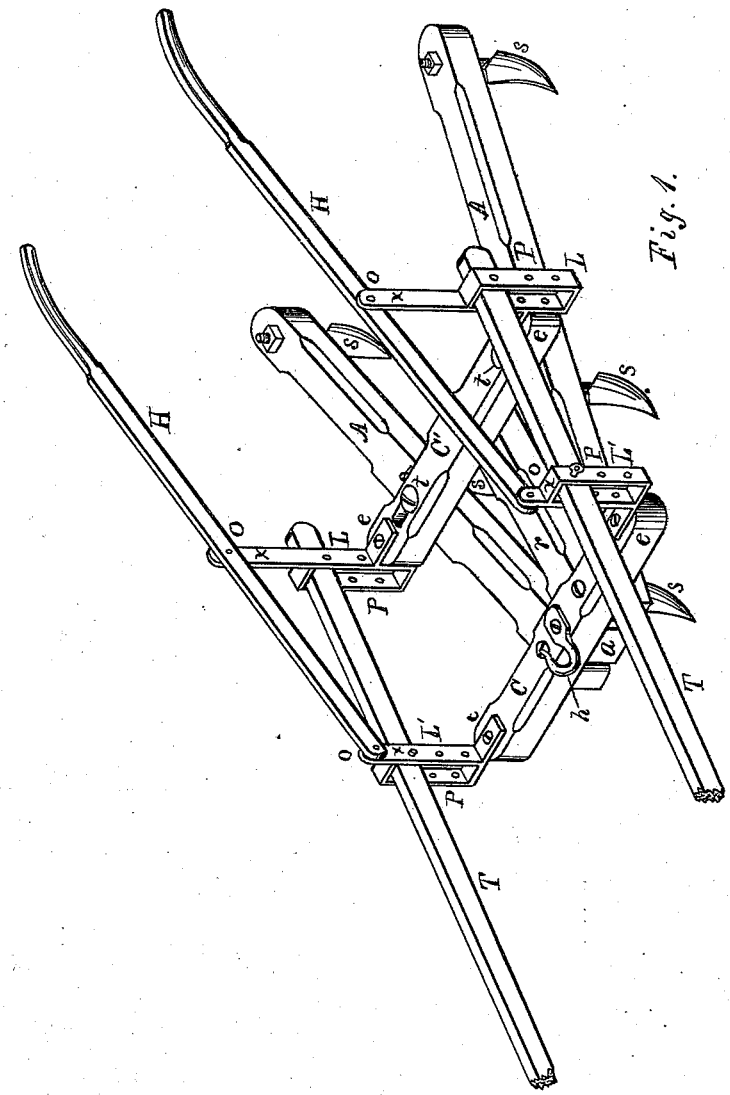

W. A. SQUIER.
CULTIVATOR.

No. 173,425.

Patented Feb. 15, 1876.

Witnesses:
O. B. Brothers
B. F. Parsons

Inventor:
W. A. Squier

UNITED STATES PATENT OFFICE.

WILLIAM A. SQUIER, OF GORHAM, NEW YORK.

IMPROVEMENT IN CULTIVATORS.

Specification forming part of Letters Patent No. 173,425, dated February 15, 1876; application filed November 4, 1875.

*To all whom it may concern:*

Be it known that I, WILLIAM A. SQUIER, of Gorham, in the county of Ontario and State of New York, have invented a certain new and useful Improvement in Cultivators; and I do hereby declare the following to be a full, clear, and exact description of the construction and operation of the same, sufficient to enable those skilled in the art to which it appertains to construct and make use of the invention, reference being had to the drawing accompanying this specification, and to the letters of reference marked thereon, in which like letters refer to like parts throughout the same, and on which—

Figure 1 represents the invention in perspective.

My invention relates to and is an improvement upon the triangular cultivator, such as is ordinarily used with a single horse in the cultivation of growing crops.

Cultivators, as commonly constructed, are too long—that is, they have, in the direction of their draft, too much inflexible space to conform to the irregularities of the ground over which they are drawn. The consequence is the cultivator shares or teeth penetrate to their full length all the prominent points of ground, while in shallow depressions they but partially do so, and deeper ones are merely scratched over by the teeth, as a result of which circumstance, while a portion of the arable soil is sufficiently broken up and comminuted, another equally important portion escapes comparatively unbroken, or but partially pulverized.

Now, the object of my improvement is, by suitable appliances hereinafter described, to adapt and adjust the common triangular cultivator and others similarly constructed, while being drawn over the ground, to all the inequalities in the surface of the same, so that the teeth will penetrate and cut all the prominences and depressions alike, and that all the irregularities of the ground will be broken up and pulverized alike, thereby adding materially to the quantity and quality of the production in the same season of tillage. It consists in a combination of elements, the chief of which are (first) two wood bars transversely attached—one at the apex of the frame and the other about midway of its length—to the top of a triangular cultivator, at the ends of which bars are secured (second) vertically applied metal loops or keepers, and at the top of whose vertically-extended single inside parts are affixed (third) handles for tending the cultivator, and into which loops, working on pivotal bolts or pins, are inserted (fourth) thills, between which the horse works in drawing the cultivator, which will now be more fully set forth.

In the perspective drawing, A A represent the longitudinal side bars, and $r$ a middle bar, of a triangular cultivator, the three bars—the middle one of which, $r$, is about half the length of the side bars—meeting and being permanently connected at the apex $a$ of the frame. C and C' are cross-bars, bolted to the middle and side bars—the bar C at the apex of the frame, and C' being set back from the apex even with the rear end of the middle bar, the three bars together constituting the frame proper of the cultivator, which, by means of the slots $t$, is made laterally extensible.

The length of the cross-bars C and C' governs the distance of the thills T apart, and, as that is regulated by the distance between the rows of growing crops, it is made as desired by the operator.

By means of elbows or flanges $e$, vertical metal loops or keepers L are attached to the ends on top of these cross-bars, the rear ones extending to the bottom of the bar, while the front ones, L', are on the top of the same, the object of which loops being for the purpose of forming recesses or pockets for receiving and retaining the thills T, also for supports for the fulcrums or pivotal points on which said thills are adjusted, and for limiting the vertical vibrations of the same in the said loops when regulating the implement to the surface of the ground.

In the perforations $p$ through the loops L and L' are pins or bolts, constituting said pivots or fulcrums, by changing which, in either of the front or rear loops, a like effect is produced. Thus, in moving the thill up or down in the loop L while it remains stationary in the loop L', or by removing the pin in the loop L' and inserting it at L, the fulcrum is merely removed; but the result is not changed, in so far as adjusting the implement to the surface of the ground is concerned, the working and manipulating the improvement in either case being about the same.

The inside portion of the loop, for the purpose of giving the handles H (when bolted to the extensions $x$ at $o$) any desired height or inclination to the frame, is vertically extended to preferred heights.

This improvement may be applied to all of this variety of farming implements.

The manner of adjusting the thills in the loops, so as to regulate the penetration of the teeth in the soil and adapt the cultivator to all inequalities of the ground, appears so evident I deem it unnecessary to detail its operation further, beyond which there is nothing requiring explanation, aside from the usual method of manipulating this class of implements.

Having now fully described the construction and operation of my improvement in cultivators, what I claim, and wish to secure of the United States by Letters Patent, is—

In a cultivator, the loops L L', provided with the perforations $p$, the elbows $e$, and extensions $x$, in combination with the vibrating thills T, handles H, and cross-bars C C', arranged for the purposes substantially as set forth.

In testimony whereof I have hereunto, in presence of these two witnesses, set my hand this 18th day of October, A. D. 1875.

WILLIAM A. SQUIER.

Witnesses:
P. B. BROTHERS,
B. F. PARSONS.